(No Model.)

P. GMEHLIN.
WREST BLOCK BRIDGE FOR PIANOS.

No. 254,209. Patented Feb. 28, 1882.

Witnesses:
John F. Wood
Edward Behr

Inventor;
Paul Gmehlin
Per. A. Horace Hastings
Atty.

UNITED STATES PATENT OFFICE.

PAUL GMEHLIN, OF NEW YORK, N. Y.

WREST-BLOCK BRIDGE FOR PIANOS.

SPECIFICATION forming part of Letters Patent No. 254,209, dated February 28, 1882.

Application filed September 14, 1881. (No model.)

*To all whom it may concern:*

Be it known that I, PAUL GMEHLIN, a citizen of the United States, residing at New York city, in the county and State of New York, have invented certain new and useful Improvements in Piano-Fortes, of which the following is a description.

The object of my invention is to produce a wrest-block bridge for piano-fortes with more solidity and having less metallic effect upon the tone of the piano and yet retain a means of fastening partly or entirely by the string-frame.

Figure 1:
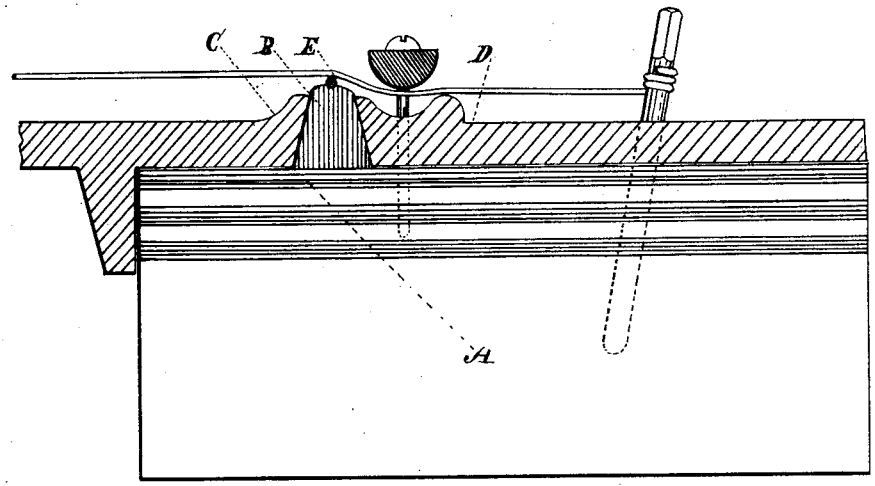
Figure 2:
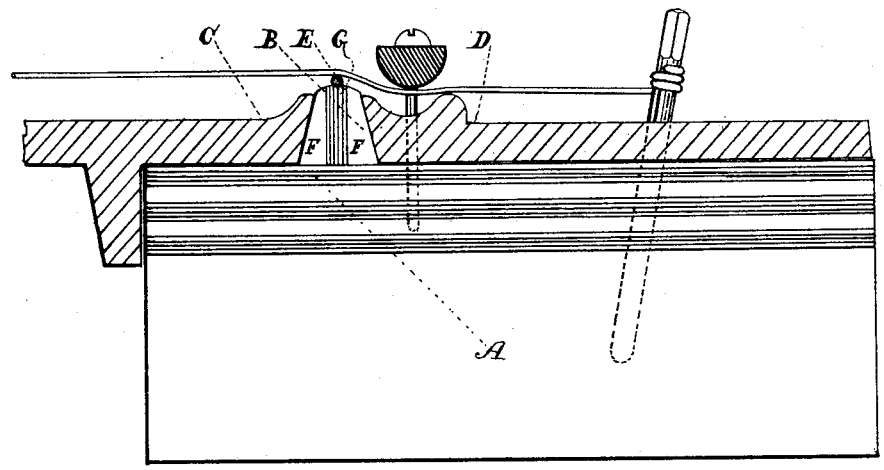

In the accompanying drawings, Figure 1 represents a cross-sectional view of the wrest-block bridge and string-frame. Said bridge is a cross-cut molding glued to the wrest-block and secured by the beveled edges on string-frame and upper plate. Fig. 2 represents a cross-sectional view of a wrest-block bridge and string-frame, said bridge being made of a molding in three pieces secured as in Fig. 1.

I make the wrest-block A in any of the ways now in use. In Fig. 1 I make the bridge B of cross-cut or length-grain molding with its two edges beveled giving it a dovetail shape, and glue its widest side securely to the wrest-block A. I make the top edge of the string-frame C correspond to the curve of the bridge B, and having its front edge beveled from the back to closely fit the bevel of the lower side of the bridge B. I arrange an upper plate, D, covering the front of the wrest-block, with its lower edge beveled from the back to fit the upper side of the bridge B, thus arranging a dovetail fastening for the bridge B. The upper plate, D, may be cast in one piece with the string-frame C.

I make a combination bridge B, as shown in Fig. 2, by constructing the molding of three pieces, having the grain of the two outside pieces, F F, run lengthwise, and the center piece, G, having its grain run across or at right angles to the grain of the outside pieces— that is, vertically to the base of the bridge—in a position for the bearing-wire E to rest on the end of the grain. The advantages of constructing a bridge in this way are easily seen, as the bridge can be made of straight pieces and bent into shape, instead of being cut into a curve, and they can be glued to the wrest-block with more firmness than cross-cut molding.

I am aware that sounding-board bridges are in use made of many thin pieces bent into their proper curve and glued together. Therefore I do not claim such bridges; but

What I claim as my invention, and desire to secure by Letters Patent, is—

1. A piano-forte wrest-block bridge of dovetail form in its cross-section, in combination with the string-frame plate C and wrest-plate D, having their edges beveled, as described, to form a dovetail groove to receive the bridge B, when mounted upon the wrest-block A, with its base resting thereon, for the purpose set forth.

2. A piano-forte wrest-block bridge of dovetail form in its cross-section, it being composed of three pieces of wood, F F G, the outside pieces, F F, having the grain running longitudinally, and the center piece, G, having the grain running transversely and vertically to the base of the bridge, and with the bearing-wire E, supported along the top of the center piece, G, in combination with the string-frame plate C and wrest-plate D, having their edges beveled, as described, to form a dovetail groove to receive the bridge when mounted with its base upon the wrest-block, as set forth.

PAUL GMEHLIN.

Witnesses:
 HENRY BEHR,
 JOHN F. WOOD.